United States Patent
Kawase et al.

(10) Patent No.: US 8,518,571 B2
(45) Date of Patent: Aug. 27, 2013

(54) BATTERY

(75) Inventors: Satomi Kawase, Aichi-ken (JP);
Tomohiro Matsuura, Toyota (JP);
Kaoru Yugahara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 708 days.

(21) Appl. No.: 12/670,174

(22) PCT Filed: Jul. 22, 2008

(86) PCT No.: PCT/JP2008/063137
§ 371 (c)(1),
(2), (4) Date: Jan. 22, 2010

(87) PCT Pub. No.: WO2009/014121
PCT Pub. Date: Jan. 29, 2009

(65) Prior Publication Data
US 2010/0203373 A1    Aug. 12, 2010

(30) Foreign Application Priority Data
Jul. 23, 2007    (JP) ................................. 2007-191446

(51) Int. Cl.
*H01M 6/10*    (2006.01)
*H01M 2/00*    (2006.01)

(52) U.S. Cl.
USPC ........................................... 429/94; 429/163

(58) Field of Classification Search
None
See application file for complete search history.

(56) References Cited

U.S. PATENT DOCUMENTS

| | | | |
|---|---|---|---|
| 4,964,877 A | 10/1990 | Keister et al. | |
| 5,882,362 A * | 3/1999 | Muffoletto et al. | 29/623.1 |
| 2008/0226982 A1 * | 9/2008 | Schubert | 429/185 |

FOREIGN PATENT DOCUMENTS

| | | |
|---|---|---|
| JP | 10-208720 | 8/1998 |
| JP | 2001-118547 | 4/2001 |
| JP | 2002-033084 | 1/2002 |
| JP | 2002-141055 | 5/2002 |
| JP | 2003-187880 | 7/2003 |
| JP | 2003-249423 | 9/2003 |
| JP | 2004-319101 | 11/2004 |
| JP | 2005-268140 | 9/2005 |

OTHER PUBLICATIONS

Notification of Submission of an Opinion for Korean Appl. No. 10-2010-7001402 dated Apr. 26, 2011.
First Official Notification of Reasons for Refusal for Chinese Appl. No. 200880100287.8 dated Nov. 16, 2011.
Extended European Search Report for EP Appl. No. 08791418.0 dated Jul. 19, 2010.

* cited by examiner

*Primary Examiner* — Patrick Ryan
*Assistant Examiner* — Christopher Domone
(74) *Attorney, Agent, or Firm* — Finnegan, Henderson, Farabow, Garrett & Dunner, LLP

(57) ABSTRACT

A battery (100) includes an electrode body (80) having a positive electrode and a negative electrode and also includes an exterior case (50) formed in a box-like shape having an inner space corresponding to the electrode body (80). An insulation film (10) is provided between the electrode body (80) and the exterior case (50) to isolate them from each other. The insulation film (10) has a bag-like shape surrounding the electrode body (80) and is placed so as not to come into contact with corners (58) of the inner space.

6 Claims, 5 Drawing Sheets

WIDTH DIRECTION

WIDTH DIRECTION

BATTERY

TECHNICAL FIELD

The present invention relates to a battery comprising an electrode assembly and an exterior case formed into a box shape, and more particularly it relates to a battery structure suitable for mounting in a vehicle.

This application is a national phase application of International Application No. PCT/JP2008/063137, filed Jul. 22, 2008, and claims priority based on Japanese Patent Application No. 2007-191446 filed Jul. 23, 2007, the contents of both of which are incorporated herein by reference.

BACKGROUND ART

Recently the importance of lithium-ion batteries, nickel-metal hydride batteries, and other secondary batteries as a power source not only for mounting in vehicles, but also for personal computers and other portable devices, has increased. In particular, lithium-ion batteries that are lightweight and provide a high energy density are expected to be used most suitably as high output power sources to be mounted in vehicles. In these types of batteries a battery structure is known that comprises a wound electrode assembly wherein a sheet-shaped positive electrode and a sheet-shaped negative electrode are laminated and wound together with a separator interposed therebetween. For example, Patent Document 1 discloses a battery comprising an electrode assembly wherein a positive electrode sheet and a negative electrode sheet are wound together with a separator interposed therebetween.

Patent Document 1: Japanese Patent Application Laid-open No. 2003-249423

In these types of batteries, the electrode assembly and the exterior case must be manufactured separately, and then the electrode assembly must be housed in the exterior case. A metal case is used as the exterior case because it has great physical strength, and in such a case a process of wrapping the electrode assembly in an insulating film to insulate the metal case and the electrode assembly is typically carried out. FIG. 8 shows one example of a process for a battery that includes such a wrapping process. The battery is constructed by first housing (packaging) the electrode assembly 1 in a box-shaped insulating film 2, then housing the insulating film 2 together with the electrode assembly 1 into the exterior case 3, and finally closing the top opening of the exterior case 3 with a lid (not illustrated).

However, there has been a problem because in conventional battery construction the insulating film is in the shape of a box having corners, and that makes it difficult to insert the insulating film (and electrode assembly) into the exterior case. For example, as shown in FIG. 9, when the inside four corners (corner members) 3b of the exterior case 3 have a rounded shape, the corners 2a of the insulating film 2 can interfere with the corner members (in this case rounded members) 3b of the exterior case 3, resulting in detrimental effects on insertability, and there is concern that in some cases creases, kinks and gaps in the insulating film 2 can occur. If the final product is manufactured with creases in the insulating film 2, the restraining force from the outside will be applied as an uneven tension on the interior of the battery. This is undesirable because there is a risk that this will have a locally detrimental effect on electrolyte circulation.

DISCLOSURE OF THE INVENTION

Taking this matter into consideration, and a primary object of the present invention is to provide a battery comprising an electrode assembly and insulating film with improved insertability into the exterior case.

The battery provided by the present invention comprises an electrode assembly having a positive electrode and a negative electrode, and an exterior case formed into a box shape and having an interior space corresponding to the electrode assembly. Furthermore, an insulating film separating the electrode assembly and the exterior case is provided between the electrode assembly and the exterior case. In addition, the insulating film is formed into a bag shape surrounding the electrode assembly and is positioned so as not to come into contact with corner members in the interior space.

Thus, by forming the insulating film into a bag shape, the film does not interfere with the corners of the exterior case, and as a result, the film (and electrode assembly) becomes easy to insert into the exterior case. In addition, it is possible to avoid a situation wherein creases and kinks occur in the insulating film, and detrimental effects on battery performance caused by those creases and kinks (e.g., locally poor circulation of electrolyte, etc.) can be prevented beforehand. Furthermore, when the corner members of the exterior case have a rounded shape, because the shape of the insulating film fits that rounded shape, dead space in the corner members is minimized, and the insulating film (and electrode assembly) can be housed efficiently therein.

In one preferred aspect of the battery disclosed herein, the electrode assembly is formed by winding together a sheet-shaped positive electrode and a sheet-shaped negative electrode with a separator interposed therebetween. The sheet-shaped positive electrode and the sheet-shaped negative electrode respectively have a positive electrode side protruding part and a negative electrode side protruding part that are wound in a protruding manner from the separator. Moreover, the positive electrode side protruding part and the negative electrode side protruding part respectively constitute the end portions of the wound electrode assembly in the direction of the central axis of winding, and the tips of the end portions in the axial direction are bundled into single units. By bundling the tips of the end portions in the axial direction of the wound electrode assembly in this manner, the electrode assembly becomes easy to insert into the bag shaped insulating film.

Preferably, the insulating film is positioned so as to enclose the tips that are bundled into single units from both sides, and is formed with projecting side portions that are bonded together so as to be integrated, distally from the tips in the axial direction.

In accordance with the above structure, because the insulating film is positioned so as to enclose the tips from both sides, wasteful gaps between the film and the wound electrode assembly (particularly gaps between the film and the tips) can be minimized, and the insertion efficiency improves thereby. Furthermore, the end portions of the insulating film assume a tapered shape, so interference with the corner member at the time of insertion into the exterior case can be reliably prevented.

In one preferred aspect of the battery disclosed herein, the insulating film is positioned so that the projecting side portions thereof come into contact with opposing inner wall side faces of the exterior case. With such a structure the insulating film (and electrode assembly) can be supported by the faces of the inner walls of the exterior case, and the insulating film (and electrode assembly) can be tightly secured in the case. In comparison with previous insulating films (typically box-shaped), it is possible to reduce the contact points between the film and the inner walls of the case from 4 points (i.e., the 4 points at the corner members) to 2 points (i.e., the 2 points at the projecting side portions), and frictional resistance at the time of insertion can be reduced thereby.

Preferably, the insulating film surrounding the electrode assembly comprises a single resin sheet that is folded back onto itself, and the edges thereof are formed into the bag shape by bonding mutually opposing sides thereof resulting from the folding. Thus, the electrode assembly can be packaged by an extremely simple construction.

BEST MODE FOR CARRYING OUT THE INVENTION

Figure 1:
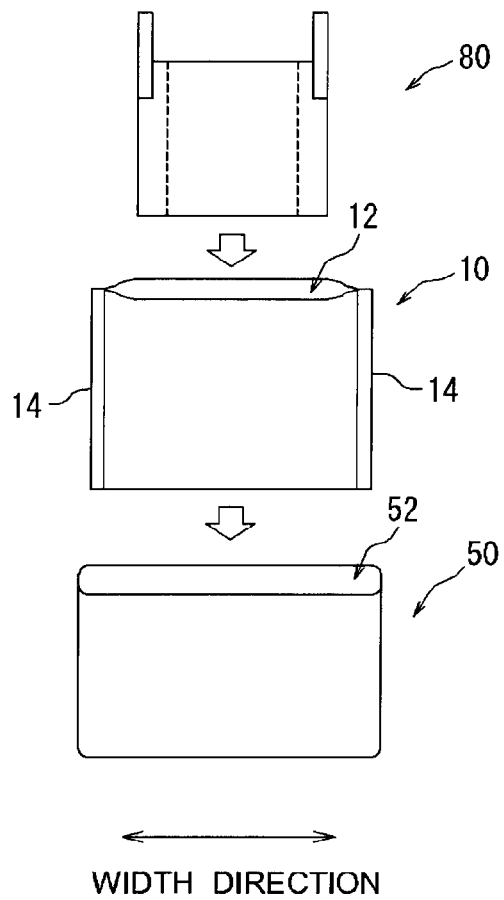
FIG. 1 is an exploded perspective view schematically illustrating the structure of a lithium-ion secondary battery of one embodiment.

In the description of the present invention the term "battery" refers to an electrical storage device capable of providing desired electrical energy, and is not limited to a specific electrical storage mechanism (electrode assembly and electrolyte configuration). A secondary lithium battery such as a lithium-ion battery, a nickel-metal hydride secondary battery or other secondary battery, or a capacitor such as an electrical bilayer capacitor, etc. (i.e. a physical cell) are typical examples encompassed by the term battery herein.

In the present description the term "electrode assembly" refers to a structure comprising at least one positive electrode and negative electrode, and constituting the main body of a battery (electrical storage device).

Embodiments of the present invention will be described below with reference to the drawings. In the drawings all positions and members providing the same action are described using the same symbols. The structure of the battery of the present invention using a rectangular lithium-ion battery 100 as an example will be disclosed in detail below. However, the present invention is by no means limited to the items described in the embodiments. In addition, the dimensional relationships (length, width, thickness, etc.) in the drawings do not reflect true dimensional relationships.

Figure 2:
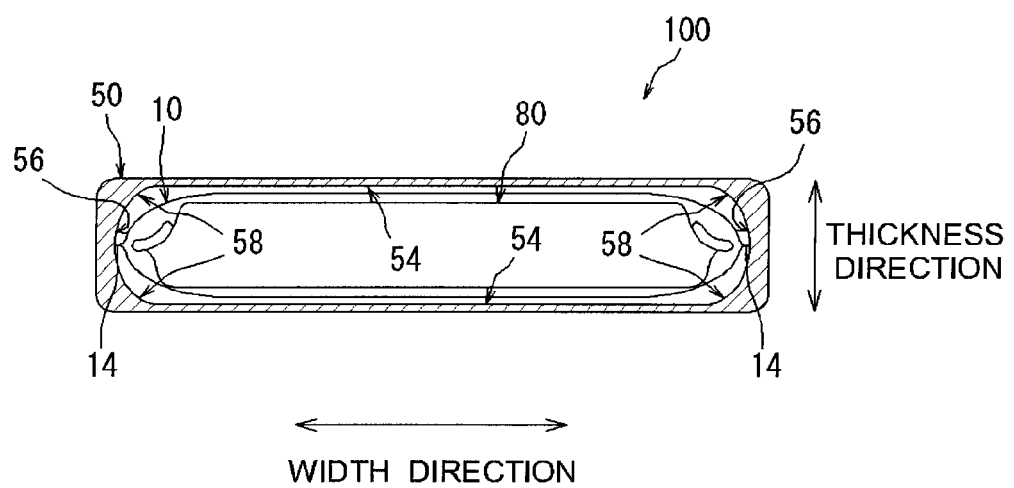
FIG. 2 is a cross-sectional schematic drawing illustrating the positional relationships of the insulating film, electrode assembly and exterior case in one embodiment.

The structure of the battery 100 will be described while referring to FIGS. 1 and 2. FIG. 1 is an exploded perspective view schematically illustrating the structure of the lithium-ion battery 100 of the present embodiment. FIG. 2 is a schematic top view illustrating the positional relationships of the insulating film 10, electrode assembly 80, and exterior case 50. As shown in FIG. 1 as one example, the lithium-ion battery 100 disclosed herein comprises an electrode assembly 80 having a positive electrode and negative electrode, and an exterior case 50 housing the electrode assembly 80 and an electrolyte. The electrode assembly 80 of this embodiment is constructed from desired battery constituent materials (active material in both positive and negative electrodes, collectors in both positive and negative electrodes, separator, etc.) in the same manner as a single cell making up a typical battery pack. In addition, a flattened wound electrode assembly 80 disclosed below is used as the electrode assembly 80.

The exterior case 50 of the present embodiment is formed into the shape of a box with the interior space thereof corresponding to the electrode assembly 80. In other words, the interior walls of the exterior case 50 consist of lateral faces 54 corresponding to the end faces in the direction of thickness of the wound electrode assembly 80 (i.e., faces corresponding to the flattened faces of the wound electrode assembly 80 housed in the case), narrow faces 56 corresponding to the end faces in the central axis of the direction of winding of the wound electrode assembly 80 (width direction of the wound electrode assembly 80), and corner members 58 that form the boundaries between the wide faces 54 and a narrow faces 56.

The material of the exterior case 50 is preferably a metal material that is strong, lightweight, and has good thermal conductivity, and examples of such a metal material include aluminum, stainless steel, and nickel plated steel. As shown in FIG. 1, the exterior case 50 has an opening 52 on top, and the electrode assembly 80 and insulating film 10 can be housed therein via this opening.

The insulating film 10 separating the electrode assembly 80 and the exterior case 50 is positioned between the electrode assembly 80 and the exterior case 50. Due to such an insulating film 10, direct contact between the electrode assembly 80, which is the power generating component, and the exterior case 50 can be avoided, and insulation of the electrode assembly 80 and the exterior case 50 can be assured thereby. The material of the insulating film can consist of a material that can function as an insulating material, and polypropylene (PP), polyethylene (PE), etc., can be suitably used therefor. In addition the thickness thereof can be about 100 μm, but can be suitably altered to match the structural conditions, etc., of the battery 100.

The insulating film 10 is formed into a bag shape surrounding the electrode assembly 80. The insulating film 10 of the present embodiment is a bottomed or bottomless bag (in this case a bottomed bag) that is open at the top as shown in FIG. 1, and the electrode assembly 80 is housed thereinto via the opening 12. Furthermore, the insulating film 10 is positioned so that it does not come into direct contact with the corner members 58 in the interior space of the exterior case 50. In other words, as shown in FIG. 2, by bonding both ends of the insulating film 10 into a bag shape, the corner members 58 and the insulating film 10 are positioned so that they do not interfere with each other.

In a battery of this configuration, because the insulating film 10 does not interfere with the corner members 58 of the exterior case 50 when the insulating film 10 (and electrode assembly 80) are inserted into the exterior case 50, it becomes easy to insert the film 10 (and electrode assembly 80) into the exterior case 50. In addition, it is possible to avoid a situation wherein creases and kinks occur in the insulating film 10, and detrimental effects on battery performance caused by those creases and kinks (e.g., locally poor circulation of electrolyte, etc.) can be prevented beforehand. Moreover, when the corner members 58 of the exterior case 50 have a rounded shape as in the case of the present embodiment, because the shape of the insulating film matches that rounded shape, dead space in the corner members 58 is minimized, and the insulating film (and electrode assembly) can be housed efficiently therein.

Figure 3:
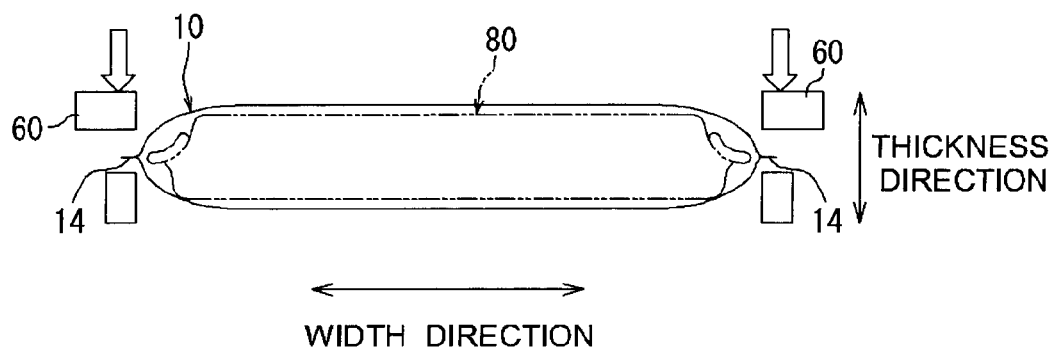
FIG. 3 is a cross-sectional schematic drawing illustrating the process of bonding the sheet-shaped insulating film into a bag shape in one embodiment.

Preferably, the insulating film 10 surrounding the above electrode assembly 80 is formed from a single resin sheet that is folded back. More specifically, as shown in FIG. 3, a film formed into the above bag shape by folding a single sheet of insulating film back on itself from the center and bonding (in this case heat bonding by a heat bar 60) the mutually opposing sides resulting from the folding can be preferably used. Thus, the electrode assembly can be wrapped by an extremely simple construction. Alternatively, two different sheet-shaped insulating films can be prepared, the faces thereof are brought into contact, and the side edges and bottom edges thereof are heat bonded to form a bag shape. In addition to heat bonding using the heat bar 60 noted above, ultrasonic bonding, laser bonding, and the like can be suitably used as the bonding method of the insulating film.

Next, while referring to FIGS. 4A to 4C, the structure of the battery 100 of the present embodiment and particularly of the wound electrode assembly 80, will be described. The wound electrode assembly 80 of the present embodiment, just as in the case of a wound electrode assembly for conventional lithium-ion battery, is a flattened wound electrode assembly 80 fabricated by laminating a sheet-shaped positive electrode 82 (hereinafter, "positive electrode sheet 82") and a sheet-shaped negative electrode 84 (hereinafter "negative electrode sheet 84") together with a total of two sheet-shaped separators 86 (hereinafter, "separator sheet 86"), and then winding together the positive electrode sheet 82 and the negative electrode sheet 84 with a slight displacement, and forcefully compressing the resulting wound electrode assembly from the side to flatten it.

Figure 4A:
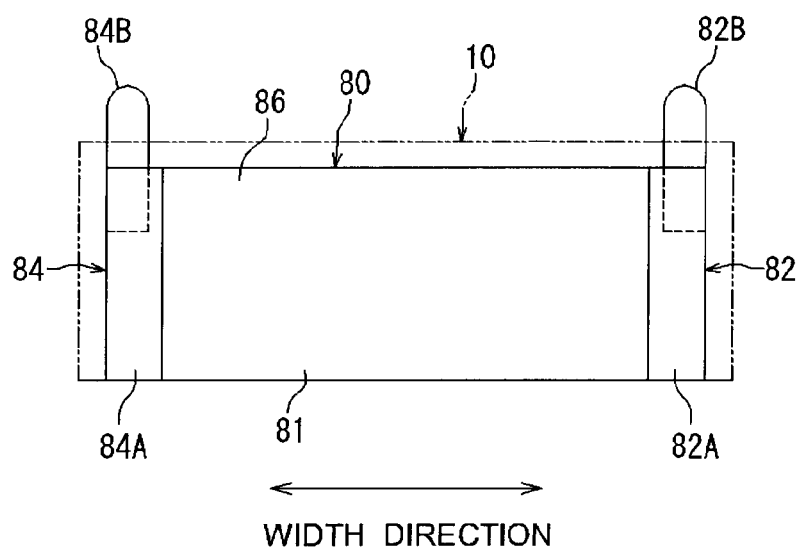
FIG. 4A is a frontal schematic drawing of the wound electrode assembly of one embodiment.

As illustrated in FIG. 4A, as a result of performing winding with the slight displacement noted above, the part of ends of the positive electrode sheet 82 and negative electrode sheet 84 each protrude toward the outside from the wound core 81 (i.e., the member comprising the tightly wound part whereon the positive active material layer of the positive electrode sheet 82 is formed, part whereon the negative active material layer of the negative electrode sheet 84 is formed, and separator sheets 86) in the transverse direction with respect to the winding direction of the wound electrode assembly 80.

Figure 4B:
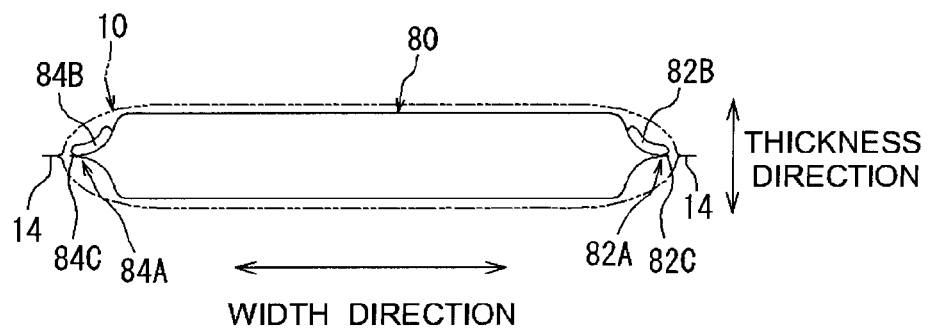
FIG. 4B is a cross-sectional schematic drawing of the wound electrode assembly of one embodiment.

As shown in FIGS. 4A and 4B, the protruding part on the side of the positive electrode (i.e., part whereon a positive active material layer is not formed) 82A and protruding part on the side of the negative electrode (i.e., part whereon a negative active material layer is not formed) 84A each constitute end portions in the direction of the central axis of winding (width direction) of the wound electrode assembly 80, and the tips 82C and 84C thereof are bundled together in the axial direction (width direction) into single units. FIG. 4C illustrates a state wherein the tips 82C of the end portion on the positive electrode side are bundled into a single unit from both sides in the direction of thickness of the wound electrode assembly (in the drawing, a state wherein they are gathered at a single location near the center). The tips 84C of the end portion on the negative electrode side are bundled together in the same manner as the tips 82C of the end portion on the positive electrode side. By bundling the tips (82C and 84C) in the axial direction (width direction) of the wound electrode assembly 80 in this manner, it becomes easier to insert the wound electrode assembly 80 into the bag-shaped insulating film 10, resulting in good insertability.

Figure 4C:
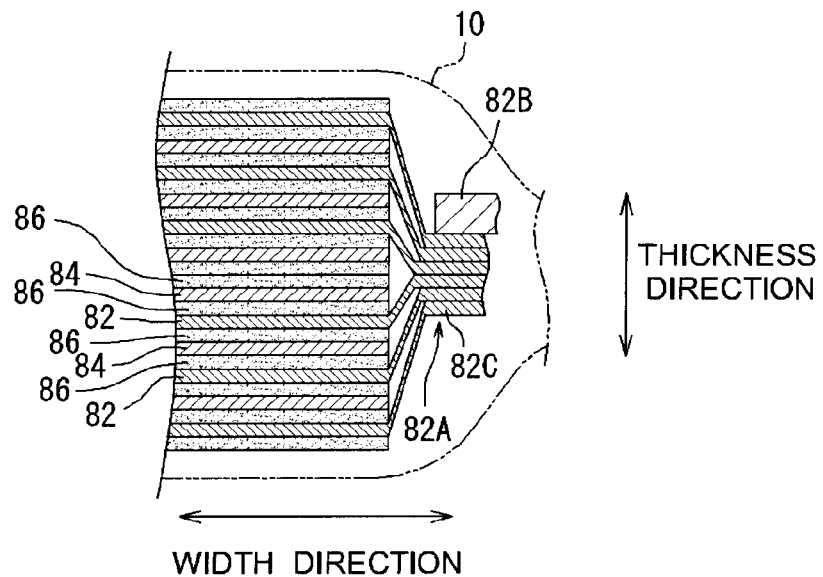
FIG. 4C is a cross-sectional schematic drawing in one embodiment wherein the major parts of the positive electrode side end portion of the wound electrode assembly are enlarged.

In addition, as illustrated in FIGS. 4B and 4C, the insulating film 10 is positioned so that the above tips 82C and 84C that are bundled into single units are enclosed thereby from both sides (from both sides in the direction of thickness of the wound electrode assembly). In other words, the bag-shaped insulating film 10 is constituted so that the width of the top opening gradually becomes smaller along the outsides of the tips 82C and 84C. As a result, wasteful gaps between the insulating film 10 and the wound electrode assembly 80 (particularly, gaps between the film 10 and the tips 82C and 84C) can be minimized, and housing efficiency is increased. Furthermore, because the tip of the insulating film 10 is tapered, interference with the corner members during insertion into the exterior case can reliably be prevented.

In the insulating film 10, projecting side portions 14 are formed by being bonded so as to be integrated, distally in the above axial direction (width direction) from the above tips 82C and 84C that are bundled into single units. The insulating film 10 of the present embodiment is positioned so that the projecting side portions 14 are in contact with the opposing inner wall side faces of the exterior case 50 (i.e., the narrow faces 56) (see FIG. 2). Therefore, the insulating film 10 (and electrode assembly 80) can be supported by the faces of the inner walls (narrow faces 56) of the exterior case, and the insulating film 10 (and electrode assembly 80) can be tightly secured in the case. In comparison with prior art insulating films (typically box-shaped), it is possible to reduce the contact points between the film and the inner walls of the case from 4 points (i.e., the 4 points at the corner members 58) to 2 points (i.e., the 2 points at the projecting side portions 14), and frictional resistance at the time of insertion can be reduced thereby.

The protruding part on the side of the positive electrode (i.e., part whereon a positive active material layer is not formed) 82A and protruding part on the side of the negative electrode (i.e., part whereon a negative active material layer is not formed) 84A are provided with a positive lead terminal 82B and a negative lead terminal 84B, respectively, and they are electrically connected to a positive terminal (not illustrated) and a negative terminal (not illustrated), respectively, provided on the exterior case.

The materials and parts per se constituting the wound electrode assembly 80 can be the same as those used in the electrode assembly of a conventional lithium-ion battery, and are not particularly limited herein. For example, the positive electrode sheet 82, can be formed by providing a positive active material layer for a lithium-ion battery on top of a long continuous sheet of positive electrode collector. Aluminum foil (in the present embodiment) or another metal foil suitable for a positive electrode can be preferably used for the positive electrode collector. One or more types of materials used in conventional lithium-ion batteries can be used as the positive active material without any particular limitations herein. Preferred examples include $LiMN_2O_4$, $LiCoO_2$, $LiNiO_2$, etc. For example, a preferred positive electrode sheet 82 can be obtained by using an aluminum foil about 2 to 4 m long (e.g., 2.7 m), 8 to 12 cm wide (e.g., 10 cm), and 5 to 20 μm thick (e.g., 15 μm) as the collector, and forming a positive active material layer for a lithium-ion battery having nickel lithium oxide as the primary component thereof (e.g., lithium nickel oxide 88 wt %, acetylene black 10 wt %, polytetrafluoroethylene 1 wt %, carboxymethyl cellulose 1 wt %) in a desired region of the surface thereof by conventional means.

The negative electrode sheet 84 can be formed by providing a negative active material layer for a lithium-ion battery on a long continuous sheet of negative electrode collector. Copper foil (in the present embodiment) or another metal foil suitable for a negative electrode can be preferably used for the negative electrode collector. One or more types of materials used in conventional lithium-ion batteries can be used as the negative active material without any particular limitations herein. Preferred examples include a carbon-based material such as graphite carbon, amorphous carbon, etc., and lithium-containing transition metal oxides and transition metal nitrides, etc. For example, a preferred negative electrode sheet 84 can be obtained by using a copper foil about 2 to 4 m long (e.g., 2.9 m), 8 to 12 cm wide (e.g., 10 cm), and 5 to 20 µm thick (e.g., 10 µm) as the collector, and forming a negative active material layer for a lithium-ion battery having graphite as the primary component thereof (e.g., graphite 98 wt %, styrene-butadiene rubber 1 wt %, carboxymethyl cellulose 1 wt %) in a desired region of the surface thereof by conventional means.

As a preferred separator 86 used between the positive and negative electrode sheets 82, 84, one made of a porous polyolefin resin can be noted. For example, a synthetic resin (e.g., polyolefin such as polyethylene, etc.) porous separator about 2 to 4 m long (e.g., 3.1 m), 8 to 12 cm wide (e.g., 11 cm), and 5 to 30 µm thick (e.g., 25 µm) can be suitably used. When a solid electrolyte or gel electrolyte as the electrolyte is used, a separator is not needed in some cases (i.e., in such a case the electrolyte itself can function as the separator).

The electrode assembly housed in the exterior case of the battery is not particularly limited to the above type of winding. For example, it can also be a laminate type of electrode assembly wherein, for example, a plurality of positive electrode sheets and a plurality of negative electrode sheets are mutually laminated together with a plurality of sheet-shaped separators (alternatively a solid or gel electrolyte that can function as a separator). Furthermore, the wound type electrode assembly is not limited to the same shape as the flatted shape illustrated in the drawings.

after the wound electrode assembly 80 is housed in the insulating film 10, the insulating film 10 is housed in the exterior case 50. In addition, a liquid electrolyte is injected via an injection port formed in the exterior case 50. In the present embodiment a nonaqueous electrolyte wherein an electrolyte material is dissolved in a nonaqueous medium is injected. For the nonaqueous medium constituting the liquid electrolyte, one or more items selected from a group consisting of ethylene carbonate, propylene carbonate, dimethyl carbonate (DMC), diethyl carbonate, ethyl methyl carbonate (EMC), 1,2-dimethoxethane, 1,2-diethoxyethane, tetrahydrofuran, 1,3-dioxolane, etc., can be used. In the sealed battery of the examples herein a mixed medium of diethyl carbonate and ethylene carbonate (e.g., weight ratio of 1:1) is used.

As the electrolyte material (supporting electrolyte) constituting the liquid electrolyte, one or more items selected from various lithium salts having fluorine as a constituent element thereof can be used. For example, one or more items selected from a group consisting of $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, etc., can be used. In the sealed battery of the examples herein, lithium hexafluorophosphate ($LiPF_6$) is used as the electrolyte material. The concentration is about 1 mol/L.

After the above liquid electrolyte is injected via the injection port, the battery 100 of the present embodiment is fabricated by sealing the exterior case 50.

Figure 5:
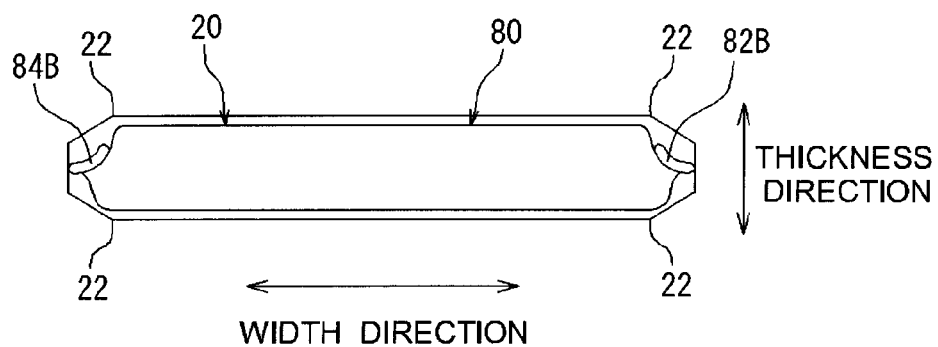
FIG. 5 is a cross-sectional schematic drawing schematically illustrating the positional relationships of the insulating film and the electrode assembly of a different embodiment.
Figure 6:
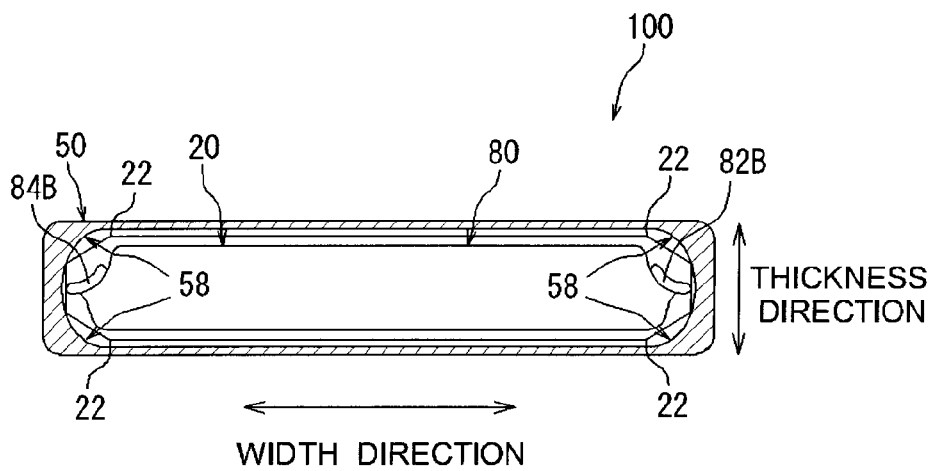
FIG. 6 is a cross-sectional schematic drawing illustrating the positional relationships of the insulating film, electrode assembly, and exterior case of a different embodiment.

The present invention has been described above through a preferred embodiment (one preferred structure of the battery of the present invention and one preferred process for producing the same), but the present invention is not limited thereto, and naturally it can be modified in various ways. For example, in the present embodiment an example has been presented wherein the insulating film is formed into a bag shape without corners (folds), but regardless of the presence or absence of corners (folds), so long as the insulating film is arranged so that it does not come into contact with the corners, excellent insertability can be achieved, and thus the insulating film is not limited to the shape described above. As illustrated in FIG. 5, even when the insulating film 20 is in the shape of a bag that has corners (folds) 22, for example, one can suitably use an insulating film 20 wherein the corners (folds) 22 are positioned at locations farther toward the interior than each of the lead terminals 82B and 84B in the axial direction (width direction) of the wound electrode assembly. As illustrated in FIG. 6, by making the corners (folds) 22 farther toward the interior than the lead terminals 82B and 84B, interference with the corner members 58 of the exterior case 50 can be avoided.

In addition, the type of battery is not limited to the lithium-ion battery noted above, and it can be a battery wherein the material constituting the electrode assembly and the electrolyte are different; for example, a lithium secondary battery with lithium metal or lithium alloy as the negative electrode, a nickel-metal hydride battery, nickel-cadmium battery, or electrical bilayer capacitor can be used.

INDUSTRIAL APPLICABILITY

The present invention provides a battery comprising an electrode assembly and insulating film with excellent insertability into the exterior case.

Figure 7:
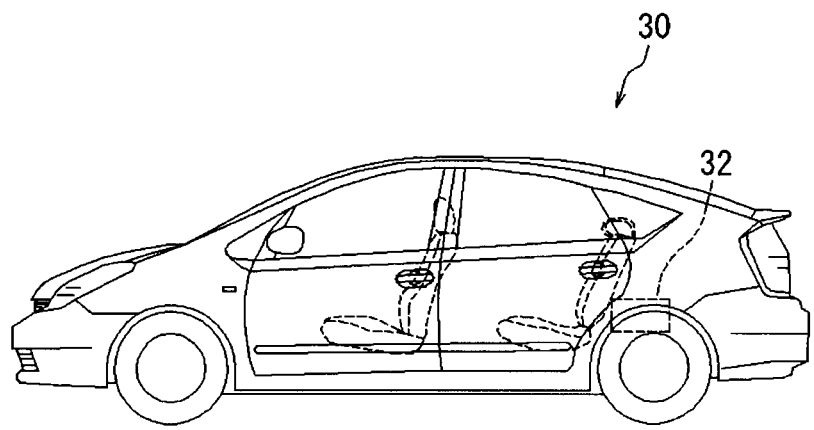
FIG. 7 is a side view schematic drawing of an automobile wherein the battery (battery pack) of one embodiment is mounted.
Figure 8:
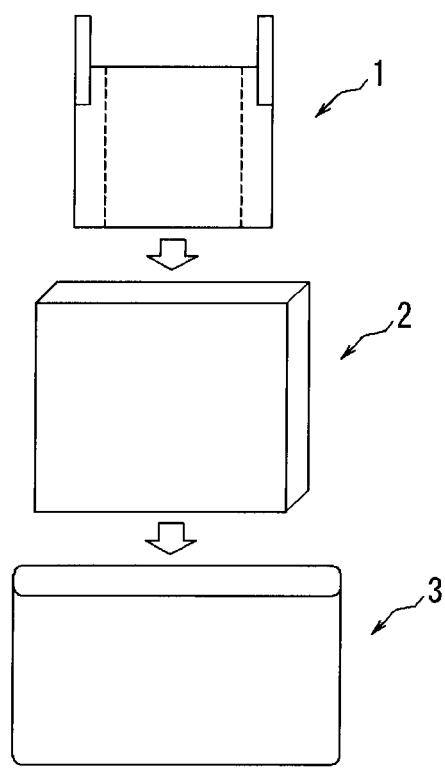
FIG. 8 is an exploded perspective view schematically illustrating the configuration of a prior art battery.
Figure 9:
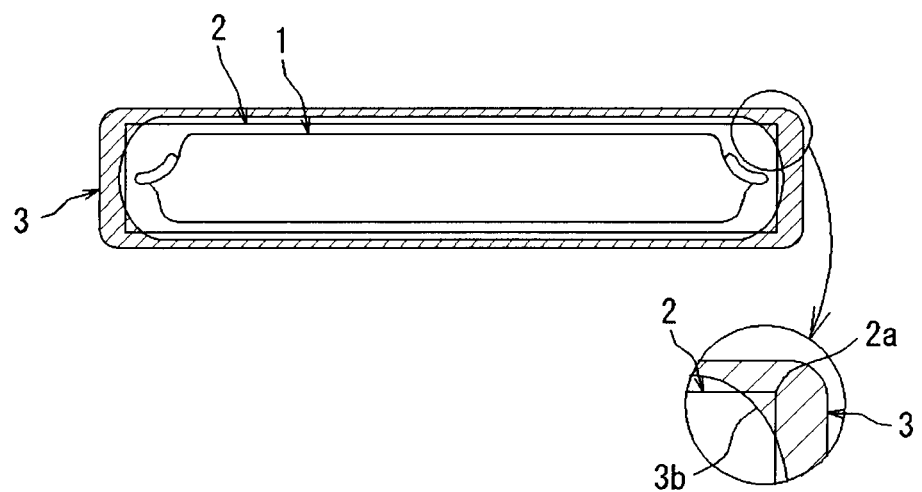
FIG. 9 is a cross-sectional schematic drawing illustrating the positional relationships of the insulating film, electrode assembly, and exterior case, of a prior art battery.

In addition, as illustrated in FIG. 7, the battery disclosed herein can be suitably used as a power source for a motor mounted in a vehicle, particularly an automobile. In other words, the present invention provides a vehicle 30 constituting a battery pack 32 obtained by arraying the battery of the present invention as single cells in a desired direction and constraining those single cells in the direction of alignment, and using that battery pack 32 as a power source (typically an automobile, and particularly an automobile comprising an electric motor such as a hybrid automobile, electric automobile, or fuel cell automobile).

The invention claimed is:

1. A battery comprising an electrode assembly having a positive electrode with a positive lead terminal and a negative electrode with a negative lead terminal, and an exterior case formed into a box shape and having an interior space corresponding to the electrode assembly;

wherein an insulating film separating the electrode assembly and the exterior case is provided between the electrode assembly and the exterior case, and the insulating film is formed into a bottomed or bottomless bag shape having an opening and surrounding the electrode assembly which is housed therein via the opening, and wherein end portions in the width direction of the insulating film have a tapered shape or the end portions have corners positioned at locations closer to a center of the interior space than each of the positive and negative lead terminals in the width direction of the electrode assembly, thereby preventing the insulating film from coming into contact with corner members in the interior space.

2. The battery according to claim 1, wherein the electrode assembly is formed by winding together a sheet-shaped positive electrode and a sheet-shaped negative electrode with a separator interposed therebetween, the sheet-shaped positive electrode and the sheet-shaped negative electrode respectively have a positive electrode side protruding part and a negative electrode side protruding part that are wound in a protruding manner from the separator, the positive electrode side protruding part and the negative electrode side protruding part respectively constitute end portions of the wound electrode assembly in the direction of the central axis of winding, and the tips of the end portions of the wound electrode assembly in the axial direction are bundled into single units, and the insulating film is positioned so as to enclose the tips that are bundled into single units from both sides, and is formed with projecting side portions that are bonded together so as to be integrated, distally from the tips in the axial direction.

3. The battery according to claim 2, wherein the insulating film is positioned so that the projecting side portions thereof come into contact with opposing inner wall side faces of the exterior case.

4. The battery according to claim 1, wherein the insulating film surrounding the electrode assembly comprises a single resin sheet folded back on itself, and the edges thereof are formed into the bag shape by bonding mutually opposing sides thereof resulting from the folding.

5. A vehicle comprising the battery according to claim 1.

6. A vehicle comprising the battery according to claim 2.

* * * * *